United States Patent Office 2,930,771
Patented Mar. 29, 1960

2,930,771

FOAMABLE HEAT INSULATING RESINOUS COMPOSITION CONTAINING A BOROHYDRIDE BLOWING AGENT

Robert C. Wade, Ipswich, Mass., assignor to Metal Hydrides Incorporated, Beverly, Mass., a corporation of Massachusetts No Drawing. Application March 18, 1957
Serial No. 646,523

6 Claims. (Cl. 260—2.5)

This invention relates to heat insulating materials and more particularly to a homogeneous liquid composition which, when dried, is a hard, tough cellular, non-inflammable material suitable for heat insulation at temperatures up to about 500° C.

The present invention provides a liquid composition which is adapted particularly, although not exclusively, for application like a paint or plaster to hot surfaces, such as steam pipes, and then to be expanded to a cellular material and dried by the heat from the hot surface. The liquid composition contains a small amount of a compound which is decomposed when the liquid composition is heated to a temperature of about 50° C. and higher to generate a gas in situ and expand the composition two or three fold. When the liquid composition is applied like a paint to a hot steam pipe it expands and dries in a few minutes so that additional coats can be applied to build up a cellular layer of desired thickness.

During preliminary investigations liquid compositions were prepared of paint-like consistency consisting of an aqueous solution of sodium silicate and a small amount of sodium borohydride or potassium borohydride. When these compositions were applied to a hot steam pipe, the heat from the hot surface decomposed the borohydride to generate hydrogen gas and expand the composition to form a cellular material. However, when the cellular material was thoroughly dried it contained large cracks which affected its insulating value and its adhesion to the underlying surface.

The present invention is based upon the discovery that these difficulties can be overcome by including in the aqueous solution of sodium silicate and alkali metal borohydride a small amount of a water soluble resin, such as polyvinyl alcohol or a resin of melamine and formaldehyde, or a water dispersible resin, such as polyvinyl acetate. Thus, the liquid composition of the invention comprises sodium silicate, a water soluble or water dispersible resin and an alkali metal borohydride and sufficient water to obtain a liquid composition having a consistency between a paint-like consistency and a plaster-like consistency. The sodium silicate, resin and borohydride are present in the proportion of about 40 parts of sodium silicate, about 4 to 12 parts of resin and about 0.1 to 0.5 part by weight of borohydride. The preferred borohydrides are sodium borohydride and potassium borohydride, since other borohydrides, such as lithium and calcium borohydrides are less stable in aqueous sodium silicate solutions.

The liquid composition of the invention may be prepared by mixing an aqueous solution of a water soluble resin of desired concentration or an aqueous emulsion of a water dispersible resin with an aqueous solution of sodium silicate of desired concentration. A concentrated aqueous solution of the borohydride then is added and the mixture is stirred to obtain a homogeneous mixture. If desired, fillers, such as diatomaceous earth, wood flour, asbestos, etc., may be added and uniformly distributed in the mixture.

While the liquid composition of the invention is particularly adapted for application to a hot surface, such as a steam or hot water pipe, steam generator or hot water heater or similar equipment having temperatures up to about 120° C., it may be utilized for preparing hard, tough cellular insulating sheets or other shapes. Thus, the liquid composition may be placed in open molds and then heated at temperatures between about 50° C. and about 120° C. to decompose the borohydride and expand the composition and render it cellular and then dry the cellular material.

The invention is illustrated further by the following specific examples.

Example 1

One hundred parts of an aqueous solution of sodium silicate containing 40 percent by weight of sodium silicate was mixed with 10 parts of an aqueous dispersion of polyvinyl acetate containing 60 percent by weight of the resin. Then 0.25 part of sodium borohydride was dissolved in one part by weight of water and added to sodium silicate-resin mixture and the mixture stirred until homogeneous. The resulting mixture had a paint-like consistency and was brushed on a hot steam pipe having a temperature between 100° C. and 110° C. Rapid expansion of the composition occurred and within a minute the cellular material had hardened sufficiently so that an additional coat could be applied. Additional coats were applied to produce a cellular coating of about one half inch thick. After an hour, the material was quite dry, hard and fireproof and had a fine cellular structure. When thoroughly dry it contained no cracks.

The same procedure was repeated using potassium borohydride instead of sodium borohydride in the proportion of 0.5 part to 100 parts by weight of the sodium silicate solution with equivalent results.

Example 2

Ten parts of a water soluble melamine-formaldehyde resin (trimethylolmelamine) was dissolved in 100 parts by weight of a solution of sodium silicate of the same concentration used in Example 1. To this was added and uniformly mixed 0.25 parts of sodium borohydride dissolved in 0.5 part of water by weight. The resulting mixture had a paint-like consistency and was applied to a hot steam pipe as described in Example 1. The resulting dried cellular material adhered extremely tightly to the metal surface and showed no signs of cracking after several days.

The same procedure was repeated using potassium borohydride instead of sodium borohydride in the proportion of 0.5 part to 100 parts by weight of the sodium silicate solution with equivalent results.

I claim:

1. A homogeneous liquid composition capable of being dried to form a hard tough cellular product suitable for heat insulation at temperatures up to about 500° C., said composition consisting essentially of about 40 parts by weight of sodium silicate, about 4 to 12 parts by weight of a resin selected from the group consisting of water soluble polyvinyl alcohol, a water soluble resin of melamine and formaldehyde, a water dispersible polyvinyl acetate and mixtures thereof, about 0.1 to 0.5 part by weight of a borohydride selected from the group consisting of sodium borohydride and potassium borohydride, and from about 60 to 65 parts by weight of water.

2. A composition as claimed by claim 1 wherein the resin is polyvinyl acetate.

3. A composition as claimed by claim 1 wherein the resin is polyvinyl alcohol.

4. A composition as claimed by claim 1 wherein the resin is a copolymer of melamine and formaldehyde.

5. A composition as claimed by claim 1 wherein the borohydride is sodium borohydride.

6. A composition as claimed by claim 1 wherein the borohydride is potassium borohydride.

References Cited in the file of this patent

UNITED STATES PATENTS

| | | |
|---|---|---|
| 2,386,995 | Wigal | Oct. 16, 1945 |
| 2,567,952 | Lewis | Sept. 18, 1951 |
| 2,699,432 | Marra et al. | Jan. 11, 1955 |
| 2,758,980 | Talalay et al. | Aug. 14, 1956 |